No. 831,258. PATENTED SEPT. 18, 1906.
T. ALEXANDER.
CASTER.
APPLICATION FILED JAN. 20, 1906.
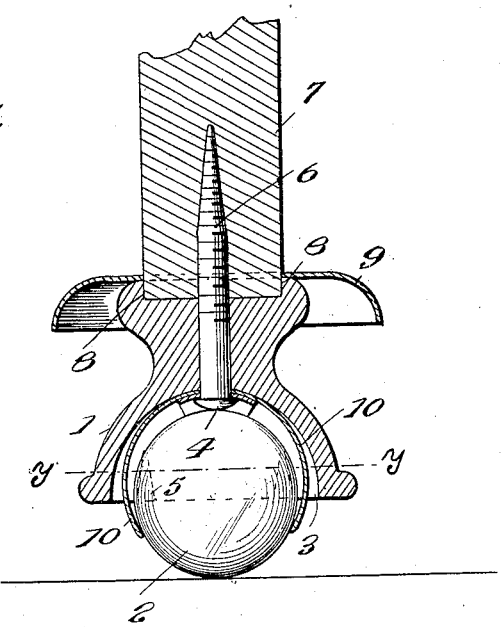
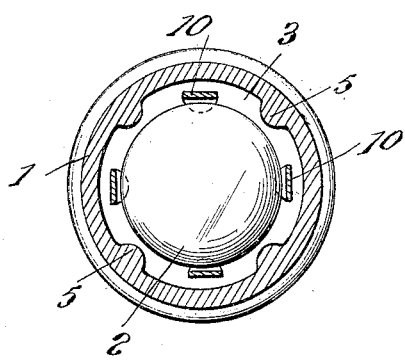
Inventor
Tony Alexander
Witnesses
By R. H. A. B. Lacey,
Attorneys
THE NORRIS PETERS CO., WASHINGTON, D. C.

UNITED STATES PATENT OFFICE.

TONY ALEXANDER, OF NEW ORLEANS, LOUISIANA, ASSIGNOR TO ALEXANDER INSECT CASTOR COMPANY, LTD., OF NEW ORLEANS, LOUISIANA.

CASTER.

No. 831,258.  Specification of Letters Patent.  Patented Sept. 18, 1906.

Application filed January 20, 1906. Serial No. 297,019.

*To all whom it may concern:*

Be it known that I, TONY ALEXANDER, a citizen of the United States, residing at New Orleans, in the parish of Orleans and State of Louisiana, have invented certain new and useful Improvements in Casters, of which the following is a specification.

This invention relates to furniture-casters, the purpose being to provide an article of this nature embodying a frame and a supporting-ball, which can be cheaply manufactured, is susceptible of universal application, and which will minimize friction and admit of the piece of furniture or other article supported thereon moving readily when shifted from place to place.

The invention contemplates a frame having a socket or depression to receive the ball, said socket having a centrally-disposed top bearing and lateral bearings, the latter being isolated and grouped about the walls of the socket so as to touch the ball at points in a plane passing horizontally through the center of the supporting-ball, the lateral bearings being elongated axially of the socket to adapt the caster for variations in the sizes of the supporting-balls and the sockets, so that the relation between the lateral bearings and the supporting-ball will be the same—*i. e.*, the points of contact between the supporting-ball and the lateral bearings being in a plane passed horizontally through the center of the said supporting-ball and a spring-holder of novel arrangement for retaining the supporting-ball in place when the caster is elevated, said holder moving laterally with the ball when shifting the furniture or like article mounted upon a caster embodying the invention.

For a full description of the invention and the merits thereof and also to acquire a knowledge of the details of construction of the means for effecting the result, reference is to be had to the following description and accompanying drawings, in which—

Figure 1 is a vertical central section of a caster embodying the invention, the ball being shown in full lines. Fig. 2 is a horizontal section of the caster on the line *y y* of Fig. 1.

The caster comprises a frame 1 and a supporting-ball 2. The frame has a socket 3 in one end of a shape to receive the supporting-ball 2, and which in the preferred form is semispherical. Bearings 4 and 5 are located within the socket and appear as protuberances or lugs and may be a part of or separate from the frame. The bearing or protuberance 4 is centrally disposed at the top of the socket so as to exert a pressure directly upon the supporting-ball 2 and may be rounded or of other form to admit of the supporting-ball obtaining a uniform purchase thereon at every position. The bearings 5 are arranged about the walls of the socket near the lower end thereof and are elongated axially of the frame and socket, the purpose being to make provision for variations in the sizes of the socket and supporting-ball, so that when the supporting-ball is in position the points of contact between the bearings and supporting-ball will lie in a plane passed horizontally through the center of the supporting-ball. This arrangement has been found to give the best results since the friction and resistance are minimized and the supporting-ball permitted to rotate with the greatest freedom. The bearings or protuberances 5 are laterally disposed with reference to the socket and supporting-ball and are designated as such in the appended claims. The protuberance or centrally-disposed bearing 4 may be formed by the inner end of a stem 6, fitted to the frame and projecting into the socket. The stem 6 may be applied to the frame 1 in any manner and serves as convenient means for attaching the caster to the leg 7 or other support of an article of furniture.

The upper end of the frame may be of any construction, and is preferably formed with a depression 8 when the caster is designed for bedsteads or like articles having the supporting-legs made tubular. The recess 8 receives the lower end of the leg 7, and the rim or flange encircling the lower end portion of the leg braces and strengthens the same and prevents splitting or spreading thereof. To attach the caster to a tubular leg or support, it is only necessary to drive a wooden plug therein and to screw the stem 6 into said wooden plug. The desirability of the caster is enhanced by combining therewith a guard 9, which is of cup form and is arranged to have its pending portion overhang and surround the upper portion of the caster. The projecting and overhanging portion of the guard is adapted to have an insecticide or some insect-repellant composition in the form of a paste applied to its lower side with the purpose of preventing vermin reaching the article mounted upon the caster.

To prevent casual displacement of the supporting-ball 2, it is proposed to provide a spring-holder and to attach the same centrally to the frame at the topmost portion of the socket. The spring-holder embodies portions 10, which are arranged to come between the protuberances or lateral bearings 5. The gripping portions 10 of the spring-holder engage with the supporting-ball at a point below a plane passing horizontally through the center of said ball, and said gripping portions are resilient and grip the supporting-ball lightly, so as to support the same when the caster is elevated without offering material resistance to the turning of the supporting-ball when the caster is in actual use. This spring-holder may be attached to the frame in any manner, and for convenience and economy of construction advantage is taken of the stem 6, the inner end projecting into the socket a distance to pass through an opening formed in the spring-holder, after which the projecting end is upset or riveted, the head thus formed retaining the spring-holder in place and providing the central bearing.

To obtain the best results, it is essential that the supporting-ball be of a size so as to leave a space between it and the lateral bearings, with the result that upon moving an article of furniture equipped with casters constructed in accordance with this invention the supporting-ball will engage with the rearmost lateral bearing and be spaced from the foremost lateral bearing, thereby reducing the friction and resistance to the smallest amount possible. The spring-holder is of such construction and arrangement as to yield laterally with the supporting-ball and permit the same to adapt itself to the direction of movement of the caster. The caster may be constructed in any manner; but it is preferred to form the frame 1 of cast metal, such as iron, and to chill the same, so that the bearing-points 4 and 5 are exceedingly hard and not subject to wear. The supporting-ball 2 is preferably of glass, porcelain, or other vitreous material which will resist wear and prevent being cut by contact with the bearings.

Having thus described the invention, what is claimed as new is—

1. A caster comprising a frame provided with a socket having lateral bearings, a supporting-ball arranged within the socket and having a limited lateral play, and a spring-holder attached at a central point to the socket and having portions lightly gripping the supporting-ball to retain the same in place and yieldable to move laterally with said supporting-ball in any direction to permit contact between the supporting-ball and the lateral bearings.

2. A caster comprising a frame provided with a socket having isolated lateral bearings, an attaching-stem fitted to the frame and having its inner end extended into the socket, and a spring-holder having portions arranged between the lateral bearings to lightly embrace the supporting-ball and retained in place by the projecting end of said attaching-stem which is upset or riveted, said upset end of the attaching-stem providing a central bearing within the socket.

In testimony whereof I affix my signature in presence of two witnesses.

TONY ALEXANDER. [L. S.]

Witnesses:
J. D. YOAKLEY,
V. B. HILLYARD.